US011470706B2

(12) United States Patent
Vissenberg et al.

(10) Patent No.: US 11,470,706 B2
(45) Date of Patent: Oct. 11, 2022

(54) LIGHTING SYSTEM AND LIGHTING METHOD

(71) Applicant: SIGNIFY HOLDING B.V., Eindhoven (NL)

(72) Inventors: Michel Cornelis Josephus Marie Vissenberg, Eindhoven (NL); Lucas Leo Desire Van Der Poel, Eindhoven (NL); Martinus Petrus Creusen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/252,489

(22) PCT Filed: Jun. 20, 2019

(86) PCT No.: PCT/EP2019/066339
§ 371 (c)(1),
(2) Date: Dec. 15, 2020

(87) PCT Pub. No.: WO2020/002125
PCT Pub. Date: Jan. 2, 2020

(65) Prior Publication Data
US 2021/0259083 A1    Aug. 19, 2021

(30) Foreign Application Priority Data

Jun. 25, 2018    (EP) .................................... 18179462

(51) Int. Cl.
*H05B 47/10*    (2020.01)
*H05B 47/155*   (2020.01)
(Continued)

(52) U.S. Cl.
CPC ......... *H05B 47/155* (2020.01); *F21V 23/003* (2013.01); *H05B 45/12* (2020.01);
(Continued)

(58) Field of Classification Search
CPC ........ H05B 45/12; H05B 45/22; H05B 47/19; H05B 47/155; H05B 47/175
See application file for complete search history.

(56) References Cited

U.S. PATENT DOCUMENTS 5,138,360 A * 8/1992 Yamasaki ............... G02B 7/36
396/104
5,893,633 A    4/1999 Uchio et al.
(Continued)

FOREIGN PATENT DOCUMENTS

WO    2008061767 A1    5/2008
WO    2015049614 A1    4/2015

*Primary Examiner* — Tung X Le
(74) *Attorney, Agent, or Firm* — Daniel J. Piotrowski

(57) ABSTRACT

The invention relates to a lighting device, a lighting system and a lighting method. The lighting device comprises a row of lighting units mounted in a first direction X on an elongated carrier wherein each lighting unit is mounted with a respective, fixed, unique, pre-determined orientation. Said lighting device is configured to directly project on a target plane P a row of light patches, said plane P extending in said first direction X and in a second direction Y transverse to said first direction. Said row of light patches extends in the second direction and wherein said lighting device is offset out of said plane P in a third direction Z. The lighting system comprises at least a first and at least one second lighting device substantially lying in line in the length direction. Optionally said first and at least one second lighting device may extend in two or three parallel rows. Said lighting system further comprises a control unit for individual control/addressing of the lighting units of the at least first and further lighting device.

14 Claims, 8 Drawing Sheets

(51) Int. Cl.
*H05B 45/22* (2020.01)
*H05B 45/12* (2020.01)
*F21V 23/00* (2015.01)
*F21Y 103/10* (2016.01)
*F21W 131/405* (2006.01)

(52) U.S. Cl.
CPC ....... *H05B 45/22* (2020.01); *F21W 2131/405* (2013.01); *F21Y 2103/10* (2016.08)

(56) References Cited

U.S. PATENT DOCUMENTS

| | | |
|---|---|---|
| 7,625,099 B2 | 12/2009 | Newton et al. |
| 8,786,170 B2 | 7/2014 | Huang |
| 9,206,950 B1 | 12/2015 | Lemons et al. |
| 9,807,356 B1 * | 10/2017 | Minami ............... H04N 9/3164 |
| 2002/0071268 A1 | 6/2002 | Pederson |
| 2007/0046899 A1 * | 3/2007 | Moro ..................... G03B 35/20 |
| | | 353/34 |
| 2014/0049164 A1 * | 2/2014 | McGuire ................ H05B 45/20 |
| | | 315/307 |
| 2014/0233250 A1 * | 8/2014 | Lee ........................... B62J 6/02 |
| | | 362/465 |
| 2015/0168717 A1 * | 6/2015 | Niu .................... G02B 27/0172 |
| | | 359/630 |
| 2015/0204487 A1 | 7/2015 | Scapa et al. |
| 2017/0138545 A1 | 5/2017 | Minor et al. |

* cited by examiner

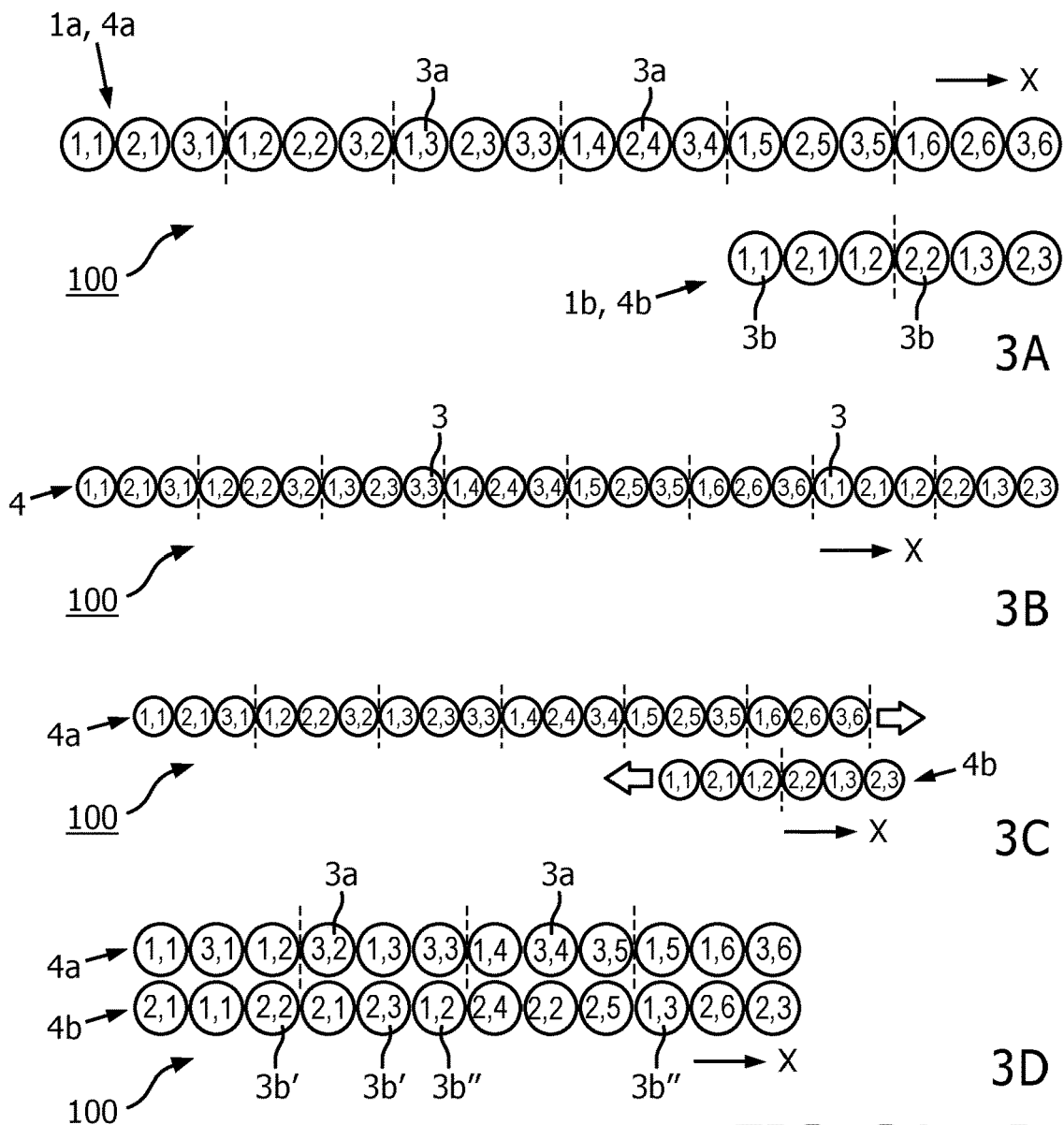
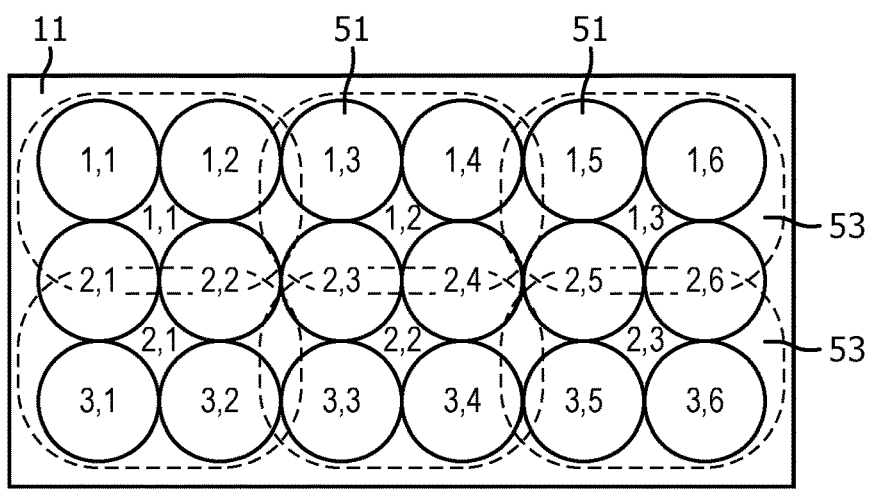
FIG. 3A - D
FIG. 4

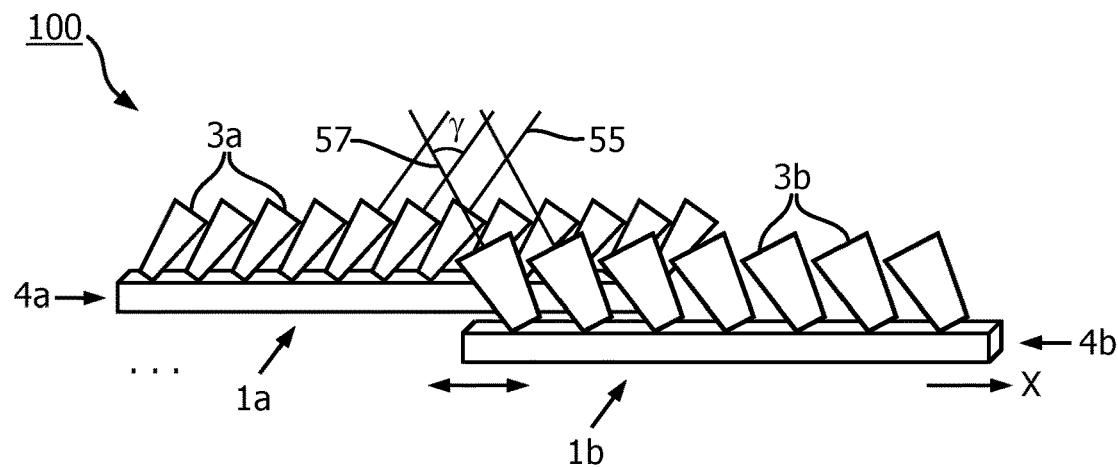
FIG. 6
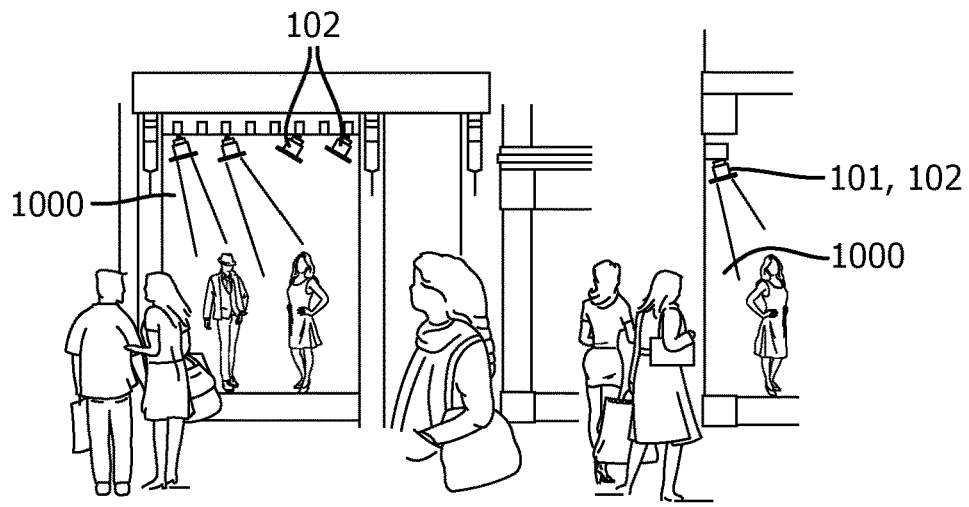
FIG. 7

LIGHTING SYSTEM AND LIGHTING METHOD

CROSS-REFERENCE TO PRIOR APPLICATIONS

This application is the U.S. National Phase application under 35 U.S.C. § 371 of International Application No. PCT/EP2019/066339, filed on Jun. 20, 2019, which claims the benefit of United European Patent Application No. 18179462.9, filed on Jun. 25, 2018. These applications are hereby incorporated by reference herein.

FIELD OF THE INVENTION

The invention relates to a lighting system and a lighting method.

BACKGROUND OF THE INVENTION

From research it is known that with known lighting devices and lighting systems setting the lighting in a shop window scene is often considered as a hassle for the shop's personal or the visual merchandiser who has to do the decoration and the lighting. It usually involves number of disadvantages:

(1) Often there is limited space in the shop window since most space is occupied by the displayed models and products. Therefore, standing in the shop window is risky, a small mistake in moving around can cause the complete scene to be disturbed.

(2) Another disadvantage is that the spots for the shop window illumination are normally installed at a higher position, out of reach for arms, which means that a ladder is needed to aim the spots. This brings again the danger to disturb the scene and the risk of falling down resulting in injuries for the staff personal of the shop.

(3) Next to the limited space it is not possible to judge the (modelling) result of the lighting (play of light and shadow) as a result of the position of the spots and the aiming since the person who is doing this is too close to the scene to (over)see the visual end result as it is visible from the street. For the best result one should be standing outside in front of the shop window and instruct someone else to get the perfect positioning and aiming of the spots to make the lighting scene as wanted.

(4) Furthermore there is the problem of over or under lighting the scene. In daytime one has to bring light on the scene with a high intensity to reduce the disturbing reflections in the window glass caused by the daylight (reflecting from opposite surfaces). This is normally done by using narrow beam spots with a high intensity to increase the brightness on the display. But there are big differences in lighting levels depending on the time, season and weather conditions. So normally the lighting level is installed to work under the most difficult lighting circumstances (so a high day light level measured by clear sky at 12.00 hours in summertime). This makes that often the display is over lit (when the daylight conditions are lower) and it consumes a lot of energy. At night time this is not needed and only a small amount of the light would enable to make beautiful more balanced lighting scenes adding to the quality of the presentation and saving energy at the same time. In practice it is often found that the same lighting solution is used 24/7.

Be aware that the same system can also be used in shops for wall and other presentation set ups. Here the arguments are mainly the same (space, ladder, position of viewing the scene from a distance to see the lighting effects).

(5) Most of the present solutions in shop windows are static. It is known from research that the human eye is very sensitive for both brightness and for movement. Normally it is not possible to make a scene with moving light unless movable spots are used. This can only be done with motorized spot products which can be programmed. For example, it is known to have track lighting systems with multiple motors for pan, zoom, tilt and movement of the lamp along a track. The disadvantage is that dynamic (mechanically moving) products are more sensitive for failures and maintenance as static products.

(6) For a more realistic/natural and attractive presentation it is preferred to use two different color temperatures and spots with different beam angles aimed from different positions. Like in a daylight outdoor situation the skylight which is diffused by clouds is normally without direction and cooler as the directional sunlight. To mimic this effect often narrow beam spots are used with a lower color temperature (looks warmer) from one side (in the profession these spots are called key light (they mimic the directional sun beams), and to fill in the (to hard) shadows wider beam spots are used having a higher color temperature (looks cooler) from the other side (in the profession these spots are called fill light). Normally it is preferred to have the key light and the fill light from opposite sides under a horizontal angle of 45 degrees and vertically under an angle of 30 degrees with the vertical, so called key/fill light spots. A lot of people who are doing shop window presentations are not aware of these effects and also often the variety of spots is not available on stock in the store.

(7) Next to key and fill light spots also a backlight effect is nice to add. In practice this is usually not done.

(8) In line with the back light also pin or up lighting spots are used. This is a spot normally installed at the bottom at the front of the shop window. This are normally narrower beam spots used to high light special details or to make theatrical lighting effects from below. In practice this is usually not done.

US2015/0204487A1 discloses an LED-based replacement light comprising individually controllable LEDs of which the operating state is controlled via signals generated by a controller which is in communication with the LEDs.

SUMMARY OF THE INVENTION

It is an object of the invention to counteract at least one of the abovementioned disadvantages of a known lighting device or a known lighting system.

Thereto the invention discloses a lighting system comprising at least one first lighting device comprising a plurality of first lighting units mounted only in a first direction along a length direction of an elongated carrier, each lighting unit being mounted with a respective, fixed, pre-determined orientation, said first lighting device being capably configured to directly project a closed patch pattern of a plurality of first light patches, wherein said plurality of first light patches extends only in a second direction transverse to the first direction, and
  wherein said lighting system further comprises a control unit for individual control of the first lighting units of the at least first lighting device and of further lighting units of a further lighting device.

In short, a row of first lighting units and a row of first light patches projected thereby extend in mutually transverse directions only. The expression "transverse direction" in this respect is intended to mean a second direction which is at an angle Δ to the first direction, for example with 75°<=Δ<=105°, preferably 85°<=Δ<=95°, such as Δ=90°. The first plurality of lighting patches may, for example, be projected on a facing, target plane P typically extending in said first direction and in a second direction transverse to said first direction wherein the lighting device is offset from set plane P in a different, third direction. Capably configured means that the first lighting units are arranged consecutively and the patches in the row of first light patches are also arranged consecutively, i.e. form a closed or continuous patch pattern when all first lighting units are in the switched on mode. When not all lighting units are switched on, the patch pattern may be interrupted.

Typically the lighting device comprises a plurality of lighting units mounted in the first direction on the elongated carrier, each lighting unit being mounted with a respective, fixed, pre-determined orientation, said lighting device being configured to directly project a plurality of light patches (typically extending in said first direction and in a second direction transverse to said first direction), wherein said plurality of light patches extends at least in a second direction different from the first direction.

The lighting device might have the feature that the first, second, and third direction are respectively the X, Y and Z direction of a Cartesian coordinate system. Then the lighting device has the features that it comprises a plurality, for example a unit row, of first lighting units mounted in a first direction on an elongated carrier, each lighting unit being mounted with a respective, fixed, unique, pre-determined orientation and is configured to generate a unique light beam with a beam angle and fixed, unique orientation for generating a unique light patch on the target plane P, said lighting device being configured to directly project on the target plane P a plurality, for example a patch row, of said light patches, said plane P extending in said first direction X and in a second direction Y transverse to said first direction, wherein said plurality of light patches extends in the second direction and wherein said lighting device is offset out of said plane P in a third direction Z. The lighting device may be in tilted position with respect to the (virtual) plane P. Furthermore, the lighting device may have at least one of the features that the respective fixed, pre-determined orientation is unique for each lighting unit and that each lighting unit has a respective fixed beam angle. As most shop windows can be seen as 3D rectangular boxes, the first, second and third direction can be most easily defined by an orthogonal XYZ-coordination system thus simplifying computer modelling, computer handling/control of the shop window illumination pattern. The lighting device thus may have the feature that the row of pre-oriented lighting units is linear and extends along one of the X, Y, or Z direction to easily fit into said orthogonal XYZ Cartesian coordination system.

In the context of the invention the following is to be understood:
- essentially each lighting unit comprises a light source and respective associated optics, a light source preferably is >=1 LED. Optionally the plurality of lighting units can generate different beam angles and color temperatures to enhance the lighting scene by the so-called McCandless method as also used in theatrical stage lighting;
- fixed, unique oriented, pre-determined means that there is no pair of optical axes of lighting units which extend in parallel;
- directly means without use of (remote) additional optics like mirrors, reflectors lenses, deflectors;
- rows not need to be linear but can be curved.

The disclosed lighting device according to the invention as claimed in the independent claims and further claimed in the dependent claims, alleviates at least one but actually most or all disadvantages mentioned above.

A first important feature of the inventive lighting device is miniaturization of the hardware, i.e. of the device used to illuminate the shop window. Thereto essentially all lighting units of the lighting device have LEDs as light sources embedded on a slim carrier, for example a bar, with a cross section diameter of a few cm at the most, typically 3 to 5 cm, and a length typically in a range of 15 cm to 180 cm, often the length is a unit length of 60 cm or a multiple thereof as these typically are unit lengths used in ceiling tiles of false ceilings. This miniaturization is achieved by (1) breaking up the low number of large spots from the prior art into a line or matrix lighting device with a large number of lighting units for generating a large number of small beams, and (2) orienting per lighting device the projected small beams of the lighting units (which require relatively small lighting units and consequently small beam forming optics) along a line instead of an extensive matrix.

The lighting device may have the feature that it comprises at least one further plurality of lighting units extending only in said first direction, said at least one further plurality of lighting units being configured to directly project further light patches so as to form a combined, integral light pattern with the first plurality of light patches projected by the first plurality of lighting units. The lighting device may have the feature that the plurality of further light patches is projected parallel and adjacent to the first plurality of light patches. The lighting device may have the feature that the at least one further plurality of lighting units lies in the extension of the first plurality of lighting units. The lighting device may have the feature that a second or a second and a third of plurality of lighting units of the at least one further plurality of lighting units is arranged in parallel and next to the first plurality of lighting units.

It may be that the lighting units are not placed in a single line but the first lighting units and second lighting units are placed in an XY-matrix, however with the number of lighting units in the X-direction (or first direction) being much larger than the number of rows positioned mutually parallel in the Y-direction (or second direction). When reference is made to lighting units in general, this may comprise first, second and/or further lighting units, whatever applicable. A similar statement applies to a row or a plurality of light patches, i.e. comprising first, second and/or further rows of light patches. Typically the number of parallel extending rows of first and second lighting units (in the Y-direction) is 1 to 3 rendering the lighting device to have a width in the range of about 2 cm to 8 cm, while the number of lighting units per lighting device in the first direction (or X-direction) is minimally 5 or 7, or typically for example about 20-60 lighting units per lighting device rendering the lighting device to have a length in the range of about 15 cm to 200 cm. This result in aspect ratio Rld of the lighting device, i.e. length divided by width, to be in a range of 3<=Rld<=100.

The advantages of a translation of the plurality of lighting units extending in the X-direction and the plurality of light patches projected thereby extending in a Y-direction transverse to the X-direction is the possibility to have a higher number of lighting patches extending in the Y-direction than the number of parallel extending rows arranged in the Y-direction and/or an improved distribution of (local) thermal load of the lighting device or system. Visualize the situation of a vertical surface homogeneously illuminated by the number of parallel rows of lighting devices, positioned offset in the Z-direction, vertically above the vertical surface. If each row of lighting devices projects a corresponding row of light patches extending in the same direction, the row of lighting units arranged the closest to the corresponding part of the illuminated vertical surface is operated at a relatively dim level, while the row of lighting units arranged the farthest from the corresponding part to the illuminated vertical surface is operated at a relatively boosted level. This results in an unbalanced, local, unfavorable, high thermal load of the lighting device or system while in the lighting device or system of the invention the thermal load is evenly distributed, as parts of the illuminated surface that are closest and farthest away are illuminated by the same lighting units of the same lighting device.

Preferably, for desired accent lighting of the objects in the shop window, the beam is typically aimed under about 45 degrees with the horizontal, X-direction, and between 45 and 60 degrees with the vertical axis, Y-direction. However, because of the limited space in a shop window, not all positions of the target area may be reached from such angles. For example, if the beams are all aimed 45 degrees to the right, the left corner of the target area of the shop window will be dark. Therefore, preferably, the beam direction varies with the position of the lighting unit (or spot). Thus, the light beams emanating from the lighting device are aimed in such a way that the complete vertical plane in the shop window is lighted more or less uniformly by a rectangular matrix of light patches, referred to as pixels or spots (for key-fill light spots). The total of first and second lighting units are individually positioned and oriented in such a way that they give a light patch to a specific area. The arrangement may be a square matrix, but a hexagonal spot layout or any other tiling of light patches is also possible. But at least the light patches comprise as a subset of light patches a first row of light patches extending transverse to the direction of first lighting units projecting this row of light patches. Preferably the light patches comprises at least one second (or further) row of light patches substantially parallel to the first row, thus the patched light pattern can form a continuous/closed illumination pattern on the target area, which typically is a (vertical) plane, for example when the target area is positioned at an average distance of at least 1 meter from the lighting device. Typically for shop window illumination a distance between the lighting device and the target area is in a range of 2 m to 4 m.

Simulations have been done for an embodiment according to the invention providing satisfactory results. In the simulation a shop window of 3 m wide is illuminated by a lighting bar with 140 small beams, covering an area of 2.1 m high and 3 m wide. The vertical spacing of the spot patches is 30 cm (7 spots per column) and the horizontal spacing is 15 cm (20 spots per row). Every beam is created by a high power LED with 200-400 lm output in combination with a beam forming optic (a TIR lens with 10 mm diameter for instance) to create a beam with a width of about 10-12 degrees FWHM for narrow spots and typically 30-40 degrees for wide beam spots. The aiming direction in the vertical plane is determined by the spots that illuminate the head and chest of a mannequin: preferably the vertical angle is in the range of 45-60 degrees. The higher and lower spot rows may deviate from this rule. The angle of the beam in the horizontal plane varies linearly between 0 degrees for the left column of spot patches to 45 degrees for the right column of spot patches. Of course, the variation could also be concentrated in the left part of the bar (say, the first meter), such that the angle can be constant at 45 degrees for the right part of the bar. In a modular approach, the bar could consist of a left segment with linearly varying angle and an arbitrary number of segments with a constant angle, to accommodate shop windows of different widths. In this way the potential problem of a dark corner of the shop window, for example in the case all key lights are at 45 degrees horizontal angle, is solved. If the window is wide, this is only a transition area, and the largest part of the window can be lit with all key lights at 45 degrees. So in a modular approach, the corner piece has a varying horizontal angle, and the regular pieces a fixed angle.

Because the lighting device is small in two dimensions and only long in one dimension it has a very limited visual (blocking, disturbing) impact on observer. Thus, it is enabled to form a lighting system along a shop window that it is unobtrusive when a number of lighting devices are combined to substantially lie in line in the horizontal length direction along the horizontal length of the shop window (the vertical direction being the direction of gravity) even when it is placed at the optimum height for illuminating the merchandise, for example at 2 m to 2.5 m above the floor. This is advantageous over conventional solutions, where it is necessary to position the bulky spots at the ceiling (which is often typically 3.5 m above the floor) to avoid the disturbing visible impact of the spots.

For the ease of understanding the invention, just the following example. For shop window lighting typically the vertical height of the target area to be illuminated is in the range of 1 m to 3 m, which means that if each lighting device of a length of about 30 cm and comprising about 10 lighting units is to illuminate a complete vertical height of up to about 3 m by key lighting (for fill lighting the number of lighting units might be different, i.e. smaller, for example half or a quarter of the number of key lighting units), then the distance between the lighting units located at both ends of the lighting device, which is then about 30 cm, should be magnified to give projected light spots spaced about 3 m apart and each lighting unit preferably gives a projected spot with a diameter of about 30 cm to provide a desired continuous/closed illumination pattern on the target area. This is obtainable by the lighting device wherein each lighting unit is mounted with a respective, fixed, unique, pre-determined orientation. It is convenient, for the ease of handling the lighting unit, that a lighting device is a relatively small entity comprising a limited number of lighting units and is used to generate only a single column of light patches on the target area. Use of a row of various lighting devices lying in line, could then generate a number of columns of light patches next to each other on the target area. Hence, a lighting system comprising a number n of lighting devices lying in line, a target area of vertical height of 3 m by a horizontal width of n*30 cm could be completely and continuously (hence without unlit dark holes or optical gaps) be illuminated by the lighting system (this typically applies for key lighting, for fill lighting the light patch size might be different, i.e. larger, for example a diameter of about 60 cm to 100 cm). By switching on/off the desired lighting units of the lighting devices/lighting system a desired light pattern on the complete (2D) target area is obtained. Yet, such a 2D pattern can also be obtained by a single, large lighting device. Though the light patch diameter and pitch of the light patch are linked, they need not necessarily be the same. If the diameter is much larger than the pitch, there simply is more overlap of neighboring spots. The diameter may not become too small because this would cause gaps (dark portions) in the illumination pattern on the target area.

Application of the inventive lighting device and lighting system is not limited to shop window illumination only, but also is suitable for other applications such as for example instore display areas, horizontal planes, street lighting, façade lighting, museum lighting, wall washing etcetera.

Alternative ways to more or less describe the same invention or a similar invention are:

- A lighting device comprising a row of lighting units mounted in a first direction on an elongated carrier, each lighting unit being mounted with a respective, fixed, unique, pre-determined orientation, said row of lighting units of the lighting device being configured to directly project (on a target plane P) a row of light patches extending in a second direction Y substantially transverse to/angled with the first direction, wherein no single plane can be identified in which both the row of lighting units and the row of light patches extend.
- A lighting device comprising a row of lighting units mounted in a first direction on an elongated carrier, each lighting unit being mounted with a respective, fixed, unique, pre-determined orientation of a respective optical axis, wherein the lighting device is configured to issue a row of light beams of said respective row of lighting units, which row of light beams as a whole, enabled by said fixed, unique, pre-determined orientations, is helically rotated and directly projected as a line of light patches extending in a second direction (on a plane P) transverse to/angled with the first direction.
- A lighting device comprising a row of lighting units immovably mounted and extending in a first direction on an elongated carrier, each lighting unit being designed to issue a respective light beam along a respective fixed, uniquely oriented, pre-determined optical axis, said row of lighting units of the lighting device being configured to issue a row of said light beams, which row of light beams together, as enabled by said fixed, unique, pre-determined orientations, is helically rotated and directly projected as a line of light patches extending in a second direction (on a plane P) sloped with the first direction.
- A lighting device comprising a plurality of lighting units mounted in a first direction on an elongated carrier, each lighting unit being mounted with a respective, fixed, pre-determined orientation, said lighting device being configured to directly project a plurality of light patches (on a facing, target plane P), wherein said plurality of light patches extends at least in a second direction different from the first direction (and wherein said lighting device is offset out of said plane P in a third direction different from the first and second direction).

In the context of the invention helically rotated means to comprise both a screw axis in which the translation axis and rotation axis coincide and the case in which the translation axis and the rotation axis do not coincide, and sloped means at an angle of at least 45°.

The lighting device may have the feature that respective solid beam angles of respective light units are such that all light patches substantially have the same shape. Preferably also the size of all the light patches is substantially the same. Thus the design of a desired illumination patters is simplified. The lighting device may have the feature that the solid beam angle is related to the angle $\alpha$ between the respective optical axis and the normal to (the plane of) the slanted target area. Typically the following relationship applies to generate a circular spot on a slanted plane:

$$\tan \beta_1 = D^* \cos \alpha / (2^* L + D^* \sin \alpha)$$

$$\tan \beta_2 = D^* \cos \alpha / (2^* L - D^* \sin \alpha),$$

wherein $\beta_1$ and $\beta_2$ relates to angles of beam width of half beam portions respectively on either side of the optical axis of the lighting unit for respectively the part of slanted surface of the target area more remote from the lighting unit than the part of said slanted surface being closer to the lighting unit.

Thus rendering light patches or spot sizes of a plurality of lighting units to be projected on the target area to be mutually of about the same circular shape and/or size.

The lighting device may have the feature that the carrier is rigid, i.e. it essentially does not deform under its own weight. Hence mounting of the lighting device is simplified as a separate mounting construction/carrier is not required and/or aiming of beams at the target area is relatively easy.

The lighting device may have the feature when viewed in projection along the first direction, the fixed orientation of the lighting units is such that essentially a single quadrant is illuminated. A first lighting unit has a respective first optical axis and a further lighting unit of said plurality of lighting units has a respective further optical axis, wherein a smallest angle $\Theta$ between the optical axes of said lighting units in projected view along the first direction is in a range of 0 to° 90°, for example 10° to 80° or 25° to 70°, such as 55°. Note that two crossing axes enclose a smallest and a largest angle, here is meant said smallest angle. Typically the lighting device/lighting system is positioned slightly vertically offset from the target area (defined with respect to the gravity direction) and about 1 m in front of the target area, i.e. shifted about 1 m towards the front in Z-direction, and then optical axes of light beams issued by the lighting device and aimed at the target area that need to cover the complete vertical height of said target area typically are at mutual angles in said range of 10° to 80°.

The lighting device may have the feature that the sequence of first lighting units has a different sequence of patches in the first plurality of light patches in the patched light pattern, for example an interspersed or interdigitated configuration. A different sequence in this context means that there is no order of (to be) projected, adjacent, light patches detectable, which is generated by the same order of adjacent lighting units in the lighting device. The row position of the lighting unit does not necessarily correspond to the row position of the spot pixel/patch and can be arbitrarily chosen. Therefore, the lighting unit positions in the bar can for instance be optimized for distributing thermal load, for example not be positioned adjacent to each other while still in the projected 2D pattern, the generated light patches are indeed adjacent to each other to form a closed pattern. Alternatively, the lighting device as claimed in any one of the preceding claims, wherein the sequence of lighting units has a same sequence of patches in the patched light pattern which renders the lighting device intuitively easier to control. A same sequence in this context means that there is an ordering of (to be) projected adjacent light patches detectable which is generated by adjacent lighting units in the lighting device having the same ordering.

The lighting device may have the feature that the lighting units are configured to generate beams having an adjustable solid beam angle. Ways for said adjustment are well-known in the art. Thus the light patch/spot size as projected on the target area can be adjusted, if required and/or desired. Typically the spot size has a diameter D, which can be varies by variation in solid beam angle and distance between lighting unit and target are. Said spot size D is related to beam angle β and the distance L between light source/lighting unit and target area according to the equation:

$$D = 2*L*\tan\beta$$

hence, the spot angle β in the perpendicular direction varies with distance L according to: $\tan\beta = D/2L$.

Thus rendering light patches or spot sizes of a plurality of lighting units to be projected on the target area to be mutually of about the same size.

The lighting device may have the feature that beams generated by the lighting units each have an elliptic shape, the ellipse of the elliptic shape having a large radius and a small radius, with the large radius of each ellipse extending in direction normal to the incident direction on the target area, such that a patch or spot size formed by the beam on the target area is essentially round. The diagonal of the light patch on the target plane becomes an enlarged diagonal in a plane spanned by the normal to the target area and the direction of the incoming beam if the incoming direction is not parallel to the normal to said target area. The spot diagonal perpendicular to this enlarged diagonal should therefore be increased in the beam as issued from the lighting device such that when the beam impinges on the target area a substantially round light patch is obtained (explained in more detail with respect to FIG. 8A-B).

The lighting device may have the feature that each patch of the row of light patches has substantially the same (peak) illuminance on the target area. Substantially the same in this context means that the ratio between the highest illuminance and the lowest illuminance is in between 0.5-2. In general a factor two of difference in illuminance is not observable by the human eye and hence is considered uniform in illuminance. Said same illuminance can easily be obtained by measuring the illuminance in the target area and subsequently adjust the power and hence the light output of respective lighting units individually.

A first rough mathematical relationship to attain a first preliminary setting of the various lighting units is according to:

$$I \rightarrow (2*L*\tan\alpha)^2 \text{ (or stated differently: } I \rightarrow D^2).$$

wherein α is the angle between the respective optical axis and (the plane of) the slanted target area, with α typically in the range of 5° to 85°, and wherein L is the distance between a respective lighting unit and the target area. Thus it is attained that approximately the same beam intensity (lux) at each location of the target area is obtained resulting in an illumination level in the target area with a relatively high uniformity. Optionally the beam intensity of each lighting device is independently controllable and adjustable for further optimization of the desired illumination pattern on the target area.

The lighting device may have the feature that the plurality of lighting units comprises between ten and three thousand, preferably between twenty-five and three hundred, more preferably between thirty and fifty lighting units per meter. A more sophisticated desired light pattern of light patches on the target area with a higher resolution is obtainable with an increasing number of light units requiring a number of at least three or five, but preferably at least ten (which for example is suitable for street lighting). Yet a too large number of lighting units involves the risk of the control/handling of the lighting device to become too complex, thus limiting the upper limit to preferably at the most thousand. Convenient numbers of lighting units are in the range of twenty-five to three hundred, and to keep it simple with yet good resolution, said number ranges from thirty to sixty.

The lighting device may have the feature that an aspect ratio AR of the light pattern covered by the array of light patches is ranging from $3 <= AR <= 50$. Typically for shop window illumination the vertical height and width of the target area to be illuminated by a single lighting device is 2 to 3 m by about 0.2 m to 0.4 m, which corresponds to an aspect ratio AR in the range of 5 to 15.

The lighting device may have the feature that essentially each of the lighting units comprises at least one respective associated LED and the at least one associated LED comprises LEDs of different color, color temperature, and/or CCT. Thus the versatility of the lighting device in providing desired illumination patterns is increased. For each lighting unit, the color, color temperature and/or the correlated color temperature (CCT) etc. of lighting units can be fixed or tunable. In particular when tunable, the at least one light source of a lighting unit comprises more than one LED and each light source is individually controllable.

The invention further relates to a lighting system comprising at least a first and at least one further lighting device according to the invention and substantially mutually lying in line in the length direction, preferably the number Nld of further lighting devices is $1 <= Nld <= 100$, more preferably $2 <= Nld <= 60$, even more preferably $5 <= Nld <= 25$. In line in this respect means that the lighting devices extend in parallel to each other and/or extend as a successive row of lighting devices. Shop windows have a wide range in horizontal width, i.e. said width may range from less than 1 m to over 10 meters (while the height of the shop windows typically ranges from only about 2 m to 4 m). Depending on the horizontal size of the shop window, but also on the degree of overlap of patches/light spots (for example when key and fill light is desired for a specific location of the target area) the number of lighting devices may range from only two to hundred, for example to completely provide the target area with the desired illumination pattern. Thereto the lighting system may have the feature that the patched light patterns of the first and the at least one further lighting device mutually match/form a closed pattern, i.e. a pattern without unlit/dark spots/optic holes.

The lighting system may have the feature that it comprises at least two parallel lighting devices extending in the first direction next to each other. The lighting system may further have the feature that the light sources from the first lighting device and at least one second (or further) lighting device being positioned in a staggered configuration, "staggered configuration" in this respect means "arranged in an alternating zig-zag configuration along the length direction", and/or have an adjustable overlap/are mutually shiftable in the first (or length) direction. The number of parallel extending strips should be kept relatively low, for example at the most three, to render the lighting system to have a relatively small dimension in cross section and thus to remain relatively unobtrusive. Alternatively, the lighting system may have the feature that two rows of light sources are comprised on a single lighting device with the light sources from the first lighting device and second lighting device being positioned in a staggered configuration and/or have an adjustable overlap/are mutually shiftable in the length direction. The multiple spots as generated by either one of the alternatives thus can be targeted at the same portion of the target area and thus, for example provide key light and fill light at said same portion. Alternatively or additionally it may also be the case that the first lighting device has first light sources of a first color, color temperature (Tc), or CCT and the second lighting device has second light sources of a second, color, color temperature or CCT different from the first light sources.

Further alternatively or additionally the lighting system may have the feature that the first light sources acts a key light and are configured to provide light at a first illuminance level and the second light sources acts as fill light and are configured to provide light at a second illuminance level lower than the first illuminance level. All these features add up to the versatility and possible application areas of the lighting system of the invention. Expressions like lower illuminance and higher illuminance in this respect could mean, but do not necessarily mean that the total flux of light issued by the second light sources is lower respectively higher than the total flux issued by the first light sources, it rather is intended to express that the luminous intensity, expressed in candela i.e. lumens/sr, is lower respectively higher and/or that the illuminance at the target area, expressed in lux i.e. lumen/m2, is lower respectively higher.

The beam width of both the key light and the fill light can be the same, yet then it should be accounted for that the illuminance on the target area of the fill light should be lower for the fill light than the illuminance of the target area for the key light. Furthermore, the lighting system with tunable lighting devices renders the lighting system to switch between the light sources, i.e. key light coming from the right and fill light coming from the left can be mutually switched easily when the same beam width for key light and fill light is used. Said switching then can easily be done for, for example, color, Tc, CCT and illuminance or flux.

The lighting system may have the feature that the first light sources are configured to increase the intensity of first light with increasing intensity of ambient light and to decrease the intensity of the first light with decreasing intensity of the ambient light, and the second light sources are configured to decrease the intensity of second light with increasing intensity of the ambient light and to increase the intensity of the second light with decreasing intensity of the ambient light. In other words, the intensity of the key light and the intensity of the fill light are mutually inversely dependent on the level (i.e. intensity) of ambient light. This enables the lighting system to adapt scene settings to be displayed to the actual ambient situation. In particular, when the ambient light level is relatively high, the key light is boosted to a level higher than the ambient light level to maintain its stand-out function of attracting attention and/or putting emphasis on a desired feature in the scene. On the other hand, as much fill light is already provided via the ambient light, the intensity of fill light provided by the lighting system is dimmed. Vice versa, when the ambient light level is relatively low, the intensity of the key light is dimmed but yet maintained above the ambient light level, as less intense key light is needed to maintain its stand-out function. On the other hand, as little fill light is provided via the ambient light, the intensity of fill light provided by the lighting system is boosted, yet to a level below the intensity of the key light for the key light to maintain its stand-out function.

The lighting system may have the feature that the number of light sources on each lighting device equals N and preferably are configured to generate a 2D pattern with N patches. With N being equal on each lighting device each target portion of the target area can be individually controlled by at least two light beams, for example to provide each target portion with at least two different colors and/or with key light and fill light. Hence, single patches of the row of light patches comprise both key light and fill light. It is noted that the feature of single patches comprising both key light and fill light can be obtained by both a single lighting device, the lighting system then comprising at least two of these lighting devices, and by a plurality of lighting devices.

The lighting system may have the feature that the number of first light sources, or key lights, is two to twenty times the number of second light sources, or fill lights. Thus a simpler, yet still relatively sophisticated lighting system is provided. The lighting system may have the feature that the key light is configured to provide light beams of a first width, typically in a first range of 5 to 30 degrees, and the fill light is configured to provide beams of a second width wider than the first width, typically in a second range of 30 to 70 degrees, such that one fill light cooperates with a plurality of key lights.

The lighting system may have the feature that the first light sources emit light on a target area in a first direction and the second light sources emit light in a second direction, said second direction being at an angle γ with the first direction with γ in the range of 10° to 160°, typically in the range of 40° to 120°. Thus, the so-called McCandless effect can be attained of which it is known that it specifically enhances the attractiveness of displayed articles illuminated in this way. It is noted that the McCandless effect can be obtained by both a single lighting device, the lighting system then comprising at least two of these lighting devices, and by a plurality of lighting devices.

The lighting system may have the feature that it further comprises third light sources essentially lying in line with light sources mounted on the first and further carriers. It thereto may have the feature that the third light source provides light with a third intensity higher than the first intensity of the key light, preferably higher than the combined intensity of first and second light to act as pin light. Alternatively, the lighting system has the feature that the third light sources are provided on a separate substrate out of line of light sources mounted on the first and further carriers. It thereto may have the feature that the third light, are arranged out of line and are configured to emit light essentially in a direction opposite to the emission direction of the key light, the third intensity being lower than the first intensity. Typically, the third light sources are then suitable to act as backlight to further enrich the desired scene, however in combination with the back light, a subset of the third light sources may be configured to provided up-light. The back light and up-light may propagate in essentially the same direction and thereto the third light sources may be comprised in a single lighting device which provides both said back light and up-light.

It is the further desirable that the lighting system has the feature that the third light has a color different from the color of the first light. The lighting system may provide simultaneously both pin light and back light, and thereto the lighting system comprises the combination of lighting devices with third light sources, a subset of said third light sources is configured to provide pin light and another subset is configured to provide back light. Hence, said third light can be up light or pin light. In line with the back light also pin or up lighting spots are used. This is a spot normally installed at the bottom at the front of the shop window. This are normally narrower beam spots used to high light special details or to make theatrical lighting effects from below. To further enhance the lighting effect, flashing of the key light and/or the pin light may be comprised in the scene settings.

The lighting system may have the feature that the further lighting devices comprise at least one second lighting device comprising a plurality of second lighting units mounted only in the first direction on the elongated carrier, each second lighting unit being mounted with a respective, fixed, pre-determined orientation, said second lighting device being configured to directly project a plurality of second light patches, wherein said plurality of second light patches extends only in the respective second, said at least first and at least second lighting device substantially lying in line in the length direction.

The lighting system may have the feature that the first lighting device has first light sources of a first color, color temperature or CCT and the second lighting device has second light sources of a second, color, color temperature or CCT different from the first color, color temperature or CCT.

The lighting system may have the feature that it further comprises a control unit for individual control and/or addressing of the lighting units of the at least first and further lighting device. This feature enables to manage local heat load to lighting devices of the lighting system and helps in reducing the maximum temperature of (local) thermal load to the system. It is also convenient if all lighting units of a respective lighting device can be simultaneously switched on/off by a single switch because if one to reduce laborious actions if one wants to (de)activate a whole lighting device. The same applies for switching on/off a whole row of lighting devices if the lighting system comprises at least two parallel rows of lighting devices, for example two, three, four or five parallel rows. Furthermore, the lighting system may have the feature that the first lighting devices are configured to issue a first beam type and further lighting devices are configured to issue a further beam type different from the first beam type, and wherein the first beam type and further beam type are tunable with respect to at least one of color, color temperature, CCT, and intensity, and wherein the control unit is configured to simultaneously change, via control signals, electronically the first beam type of the first lighting devices to the further beam type and the further beam type of the further lighting devices to the first beam type. Thus, the lighting system with tunable lighting devices renders the lighting system by using the control unit to electronically switch the type of beams generated by the light sources, i.e. key light coming from the right and fill light coming from the left can be mutually switched easily (in particular when the same beam width for key light and fill light is used), to result in fill light coming from the right and respectively key light coming from the left. Said switching then can easily be done for, for example, color, Tc, CCT, intensity and illuminance level or flux.

The lighting system may have the feature that the control unit comprises a graphical display configured to display the patched pattern. Said patched pattern typically is formed by the row of patches on a target area. Optionally the lighting system may have the feature that the control unit comprises a camera configured to monitor, picture and/or display in situ and/or in real time said patched pattern. This is a direct way to see the effect of switching on/off respective lighting units, thus simplifying the settings of the (desired) light pattern. The camera can be or comprise a sensor as an integrated (built-in) and/or as a non-integrated (separate) device to measure actual (ambient) lighting conditions for instant adjustment of the light intensity of the beams projected on the target area, for example so that when the ambient light level is low (such as in the evening or night) the light level provided to the shop window is lowered to counteract glare and/or over-illumination, or during periods when there is bright sunlight, the illumination provided to the shop window is boosted to still attract attention to the displayed articles in the shop window to (potential) customers.

The lighting system may have the feature that the control unit is configured to be programmable with scenes for providing dynamic lighting scenes on a target area. Thus an improved presentation and/or an enhancement in drawing attention of (potential) customers to displayed articles in the shop window is attained. To enable the lighting system to automatically adapt scene settings to be displayed to the actual ambient situation, the lighting system might have the feature that the type of displayed/performed programmable scene is dependent on the time of day and/or ambient light level.

The lighting system may have the feature that the graphical display comprises a touch screen by which the lighting units can be controlled. This provides a lighting system with a user-friendly interface.

The lighting system may have the feature that it is configured as a shop window lighting. Yet also applications in street lighting or interior lighting, for example in theatres, bars and/or entrance halls of hotels are envisaged.

The invention further relates to a lighting method using a lighting system according to the invention, said method comprising the steps of:
  selecting a scene for a target area;
  selectively switch on lighting units of a respective lighting device extending in the length direction to create a patched lighting pattern extending in a direction transverse direction to the length direction;
  assessing the obtained lighting effect on the identified scene;
  repeat the steps of selectively switching on lighting units of lighting devices and assessing the obtained lighting effect until completion of the scene.

The lighting method may further comprise the step of:
  adjusting the obtained lighting effect.

Typically the set-up for a scene setting, such as for a shop window, can be done locally, i.e. at the location of the shop window itself, but alternatively or additionally said scene setting can be done remotely, for example by an expert from a central location where various shop windows for various branches of a shop chain are controlled by said expert. Thereto the method may be performed from a remote location and comprise the steps of:
  taking a shot of a shop window for which a scene is to be set;
  transferring the shot via electronic means to a remote control station;
  performing the steps of claim selecting a scene for a target area;
  selectively switch on lighting units to create a patched lighting pattern;
  assessing the obtained lighting effect on the identified scene/target area, and optionally the step of
  adjusting the obtained lighting effect, via a remote control at the remote control station.

Typically the shot (photograph) is in digitalized form and the electronic means to transfer the shot are well-known, such as via internet, e-mail, wire-less data-communication systems. Instead of performing the method step by step from a remote location, the instructions for the new scene settings may also be collected and send as a set of instructions to the target shop window. This method also enables to monitor and/or maintain the status of a specific shop window, upon detection of failure of an active device of the lighting system, a signal to repair the system can be created, but alternatively or additionally, the settings of other devices of the lighting system can be adjusted from a central, remote location to compensate for the failure of said active device.

BRIEF DESCRIPTION OF THE DRAWINGS

The invention will now be further elucidated by means of the schematic drawings describing various embodiments which are not intended to limit but rather to exemplify the versatility of the invention. In the drawings:

FIG. 3A-D shows various arrangements of the lighting devices and lighting units in a lighting system according to the invention;

FIG. 4 shows higher resolution for key light than for fill light on target area portions as obtained by the lighting systems shown in FIG. 3A-D;

FIG. 6 shows a lighting system comprising parallel extending lighting devices with adjustable overlap;

FIG. 7 shows a comparison between convention shop window lighting and shop window lighting using the lighting system according to the invention;

DETAILED DESCRIPTION OF THE EMBODIMENTS

Figure 1A:
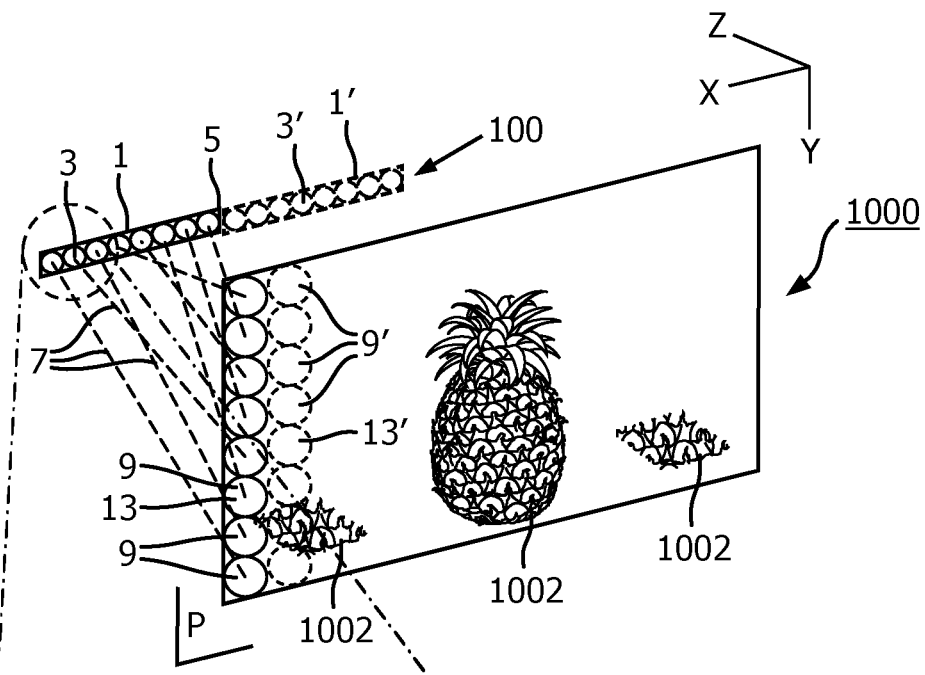
FIG. 1A shows a perspective view of a shop window for explaining the principle of the invention.

FIG. 1A shows a perspective view of a shop window 1000 provided with displayed articles 1002 for explaining the principle of the invention. Thereto it shows a first, lighting device 1 comprising a linear row of eight lighting units 3 mounted and extending only in a first direction X on an elongated carrier 5. Alternatively, the lighting device, the carrier and/or the row of lighting devices might have a slightly curved shape, for example over a curvature angle of at the most 30°. Each lighting unit 3 being mounted with a respective, fixed, unique, pre-determined orientation as indicated by a respective optical axis 7. Said first lighting device 1 being configured to directly project on a target area 11, i.e. plane P in which the displayed articles 1002 are located, a first row of light patches 9, said plane P extending in said first direction X and in a second direction Y transverse, i.e. $\Delta \approx 90°$ however slightly deviations are possible, to said first direction (when directions XYZ are according to an orthogonal Cartesian Coordinate System, $\Delta = 90°$). Said first row of light patches 9 extends in the second direction Y and forms a closed pattern 13. Said lighting device 1 is offset in a third direction Z out of said plane P. The sequence of lighting units 3 is different from the sequence of patches 9 in the patched light pattern 13 but rather is arbitrarily chosen for reducing or optimization of local thermal load. In shadow (indicated by the dotted figures) a further or next lighting device 1' comprising a next row of lighting units 3' and its corresponding next row of light patches 9' is indicated. As shown said next (or further) lighting device 1' substantially lies in line in the length direction X with the first lighting device 3, and forms together with the first lighting device 3 a lighting system 100. Also shown is that the next row of light patches 9' is projected on the target area 11 adjacent to the first row of light patches 9 together match and form a closed pattern 13'.

Alternatively FIG. 1A can be considered to show only a single lighting device. Then the first and further lighting device as shown in FIG. 1A are integrated into one lighting device, the lighting units 3 of the first lighting device are the first plurality of lighting units 3 projecting first plurality of light patches, and the lighting units 3' of the further lighting device 1' are then called the further plurality of lighting units 3' projecting a further plurality of light patches.

Figure 1B:
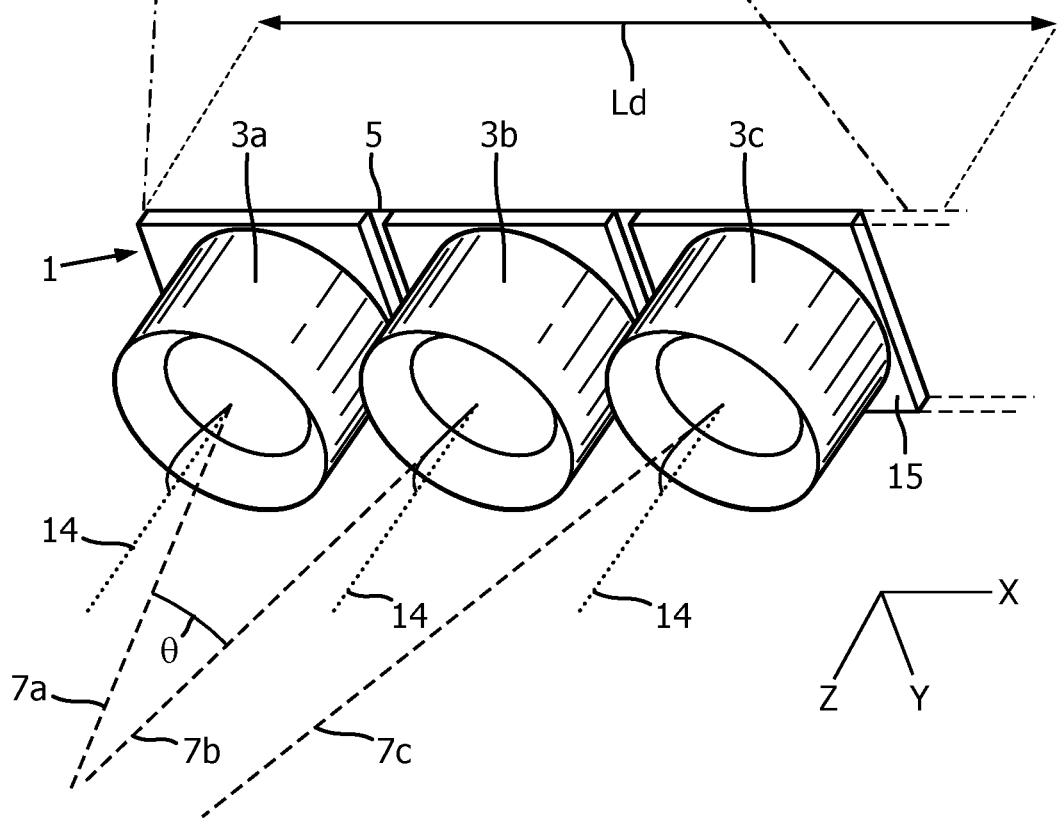
FIG. 1B shows a detail of three lighting units of FIG. 1A.

FIG. 1B shows a detail of three (first) lighting units 3 of the lighting device 1 of FIG. 1A. For each lighting unit 3 a respective light source, in the figure a respective LED, a fixed respective reflector with a fixed respective optical axis 7 is shown. Also normals 14 (orthogonal lines) to a main surface 15 of the elongated carrier 5 of the lighting device 1 are shown, the carrier 5 having a length Ld. As shown in the figure each respective optical axis is at a respective angle with the normal. Furthermore, a first lighting 3a unit has a respective first optical axis 7a and at least one further lighting unit 3b,3c in said row of lighting units has a respective further optical axis 7b,7c, wherein a largest angle Θ between said optical axes 7a-7c is in the range of 10° to 80°, in the figure Θ is about 60 degrees.

Figure 1C:
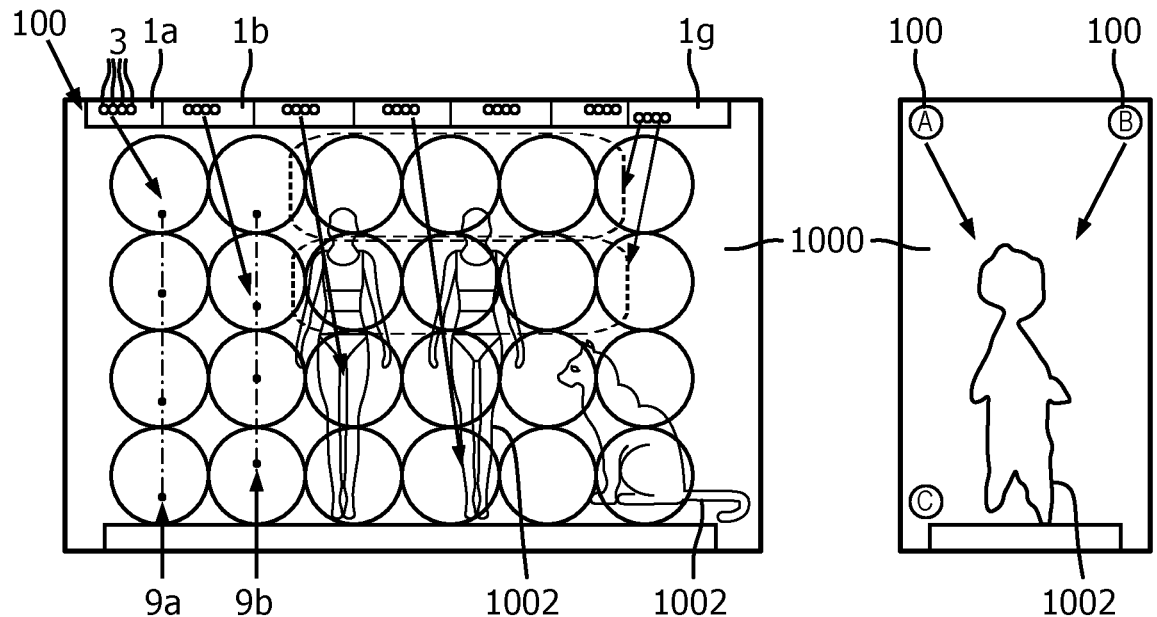
FIG. 1C-D shows both a front and a side view of a shop window for further explanation of the principle of the invention.
Figure 1D:
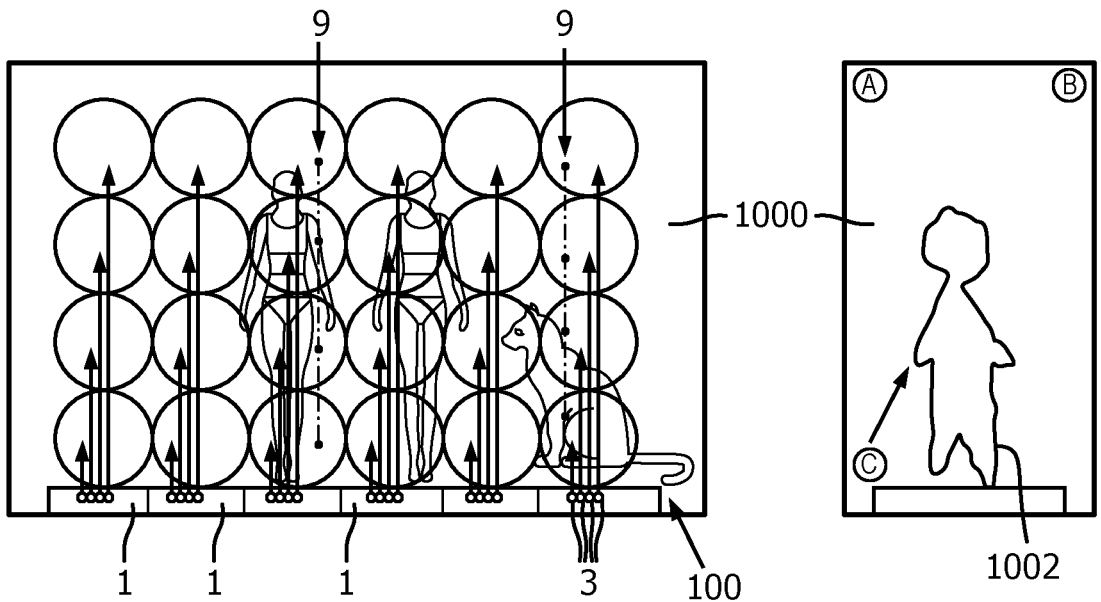

FIG. 1C-D shows a front view of a shop window 1000 for further explanation of the principle of the invention. FIG. 1C shows is a lighting system 100 comprising a first row of six (first and further) lighting devices 1 located at a height of about 2.2 m above the displayed articles 1002 in a shop window. For the case of simplification each lighting device 1 comprises only four lighting units 3. A first lighting device 1a is configured to generate a first vertical row (also referred to as column) of four bordering, or optionally partly overlapping, patches 9a on the target area 11. In the figure only the first lighting unit of the first lighting device is activated (switched on) and generates a first light patch of key light on the target area. Here, the sequence in the lighting units is the same as the sequence in the light patches, i.e. in the lighting device the lighting units are arranged from left to right and in the same order the corresponding light patches are arranged from top to down. Similarly to the first lighting device, a second lighting device 1b is configured to generate a second column of four patches 9b on the target area, in the figure only the second lighting unit of the second lighting device is activated (switched on) and generates a second light patch of key light on the target area. Similarly, third and fourth lighting devices are applied, the fifth and sixth lighting devices are not activated (counting from left to right). The light system thus illuminates the target area with a desired (closed) lighting pattern of key lights. In a similar manner fill light is provided, in the figure provided by lighting device 1g. The spot size of the fill light is about three times larger than the spot size of the key light. In the right part of the figure, a side view of the shop window is given showing that the lighting devices for providing key light, indicated by character A, all lie in line while the lighting device providing fill light, indicated by character B, lies parallel but out of line with the lighting devices providing key light. As shown in the right part of the figure the mutual position of key light and fill light is shown by respectively character A and B. By activating specific lighting units only, a desired light pattern can be created to highlight desired details of the displayed articles.

FIG. 1D shows a similar lighting system 100 as shown in FIG. 1C, however, here the lighting system is located at the floor of the shop window 1000 for providing uplight as backlight. In the lighting system of FIG. 1D all six lighting devices 1 for providing uplight are in full operation, i.e. all four lighting units 3 of each lighting device is switched on and the target area is completely illuminated by the various vertical rows (columns) of light patches 9, which, just for the sake of explanation, are not shown to have overlap, but in reality an overlap between adjacent light patches may be or is the case. Here also, the sequence in the lighting units is the same as the sequence in the light patches. In the right part of the figure, a side view of the shop window 1000 is given showing the position of the backlight, indicated by character C and here serving as uplight, with respect to the position of key light (indicated by character A) and fill light (indicated by character B) in the shop window.

Figure 2A:
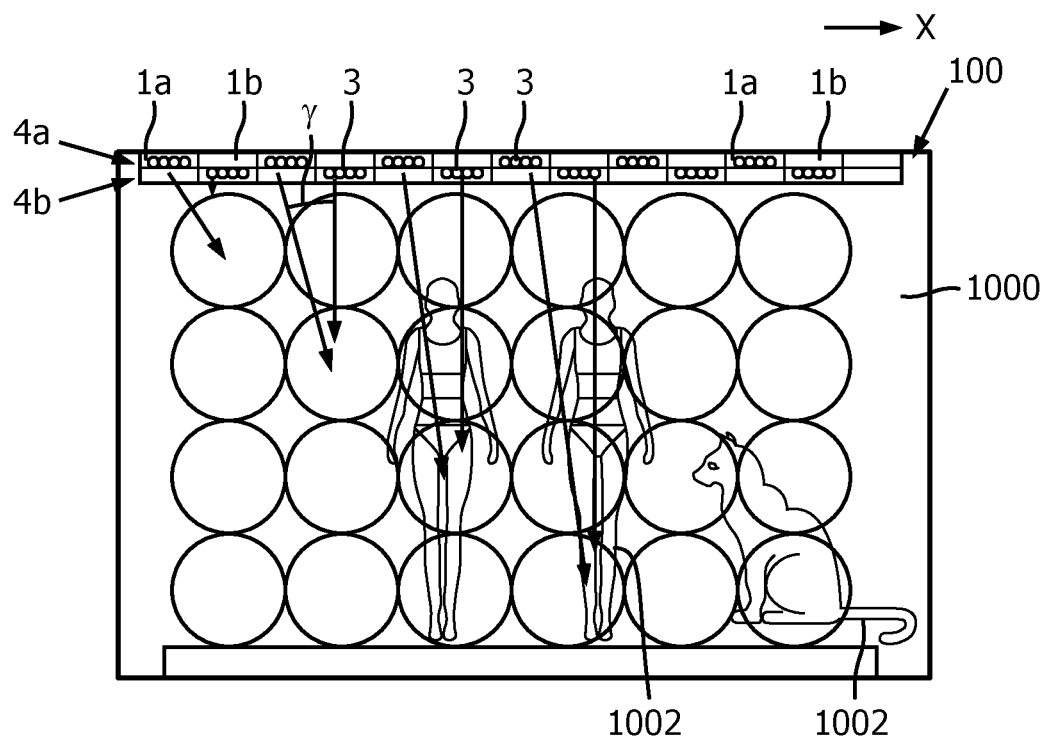
FIG. 2A-B shows a front view of a shop window with target portions of the target area being illuminated by respective two lighting units.
Figure 2B:
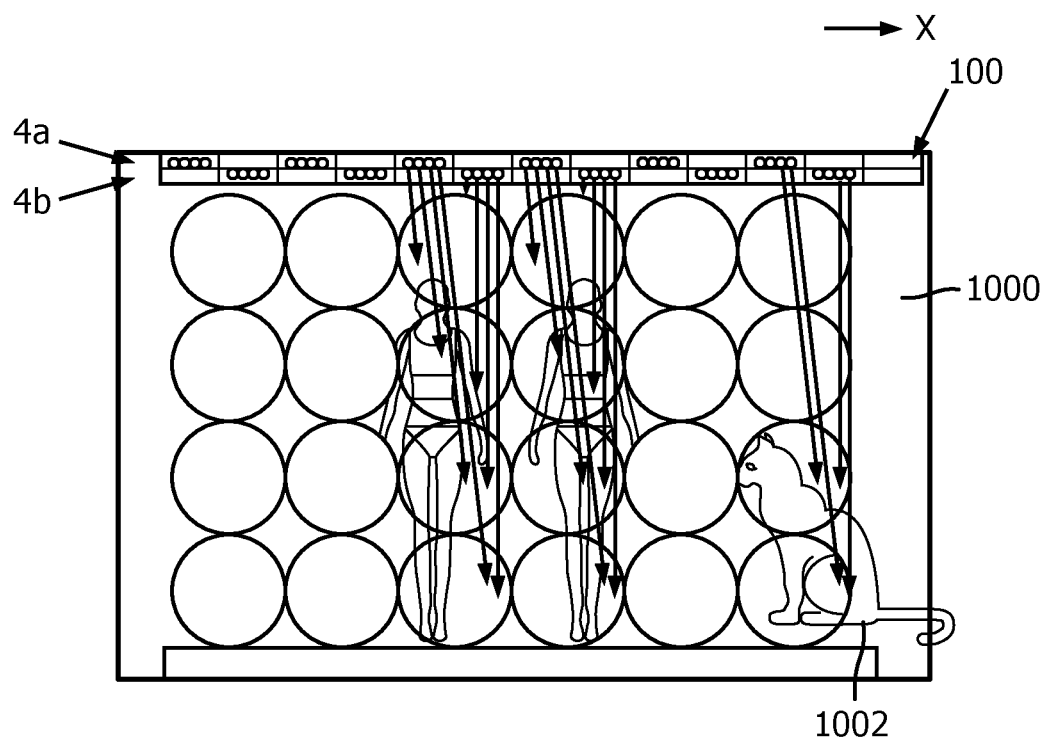

FIG. 2A-B shows a front view of a shop window 1000 with some target portions of the target area 11 being illuminated by respective first and further (second) lighting devices 1a,1b. The lighting system 1 shown in FIG. 2A comprises two parallel rows of lighting devices 4a,4b extending in the first (X) direction, of which only some lighting units 3, in the figure LED-reflector units, are switched on. The first row of lighting devices 4a provides key-light to the target area 11, and the second row of lighting devices 4b provides fill-light to the target area of a different, i.e. higher color temperature (Tc) or higher correlated color temperature (CCT) than the CCT of the key light. The LEDs of the first lighting devices emit light on a target area in a first direction and the second LEDs of the second lighting devices emit light in a second direction, said second direction being at an angle γ with the first direction with γ in the range of 10° to 40°. Thus, the so-called McCandless effect can be attained and enhances the attractiveness of displayed articles 1002 illuminated. The lighting system 100 shown in FIG. 2B comprises two, fixed parallel rows of lighting devices, i.e. first lighting device 4a, and further lighting device 4b extending in the first (X) direction, of which some lighting units 3 are switched on, i.e. in this case only those lighting devices are switched on to issue both key light and fill light of mutually different CT or CCT to the target area where the displayed articles are located. Note that the spot size of the key light patch and the fill light patch are (about) equal in size. Portions of the target area to be illuminated by lighting units where no displayed articles are located are in the off-state. Thus it is attained that the displayed articles 1002 stand out in the shop window 1000 and attract more attention.

For instance a known lighting system comprising five conventional spots of Philips Magneos each having a flux of typically at least 3000 lm and a size of 0.26×0.16 m, can be replaced by the lighting system 100 shown in FIG. 2A-B. Then, typically said inventive lighting system comprises about 150 high power LEDs (each emitting 200-400 lm) as lighting units 3, or alternatively 300-400 mid-power LEDs (each emitting about 60-100 lm) as lighting units. Though in the schematic drawing of FIG. 2A-B only a limited number of these lighting devices 1 are shown, i.e. only six lighting devices 1 per row, in practice this number is about eight, and each lighting device in the figure has only four LEDs+ collimator as lighting units 3, but in practice each lighting device comprises about ten lighting units. With this number of lighting units, a matrix of light spots may be created of about 8-16 pixels high and about 10-20 pixels wide. The light generated by the LED and is focused by a small optical element per LED, typically 1- 2 cm diameter per optical element. Thus the light bar comprises a single row of lighting devices may typically be about 1-2 cm wide and at least 1.5-2.0 m long. Two or three parallel rows of lighting devices 4a,4b typically together have a cross section of about 6 cm diameter. It is important to note that the creation of an addressable matrix of pixels does not require a significant over installation of LEDs: the amount of light generated will be comparable to the conventional system (installed for maximum light output during a sunny day), and the light patterns are created by switching off pixels when less light is needed (in the evening/at night).

FIG. 3A-D shows various configurations of the first and further lighting devices 1 each comprising three lighting units 3 in a lighting system 100 according to the invention. All the configuration shown in FIG. 3A-D have, by way of example, eighteen lighting units 3 of six lighting devices 1a providing patches of key lights and six lighting units 3b of two lighting devices 1b providing patches of fill lights, divided over eight lighting devices 1a,1b in total. In the configuration of FIG. 3A the lighting system comprises two parallel rows of lighting devices 4a,4b. A first row 4a comprising six lighting devices 1a lying in line in the length (X) direction, a further, second row 4b comprising two lighting devices 1b lying in line in the length direction and parallel to the first row. The eighteen key lights are divided over six lighting devices of the first row 4a, each comprising three lighting units 3, and the six fill lights are divided over two further lighting devices of the second row 4b, each comprising three lighting units. FIG. 3B-D show the same lighting devices and lighting units in alternative arrangements, where in FIG. 3B all the lighting devices 3 are arranged in a single row 4 and lie in line in the length direction (X). In FIG. 3C a same arrangement is shown as in FIG. 3A, however with the additional feature that the first row 4a and second row of lighting units 4b are mutually shiftable along each other in the length direction (X-direction) enabling the shift of the patches of fill lights over the patches of key lights at the target area. FIG. 3D shows and arrangement of two parallel equally long rows of lighting devices, a first row 4a comprising twelve key lighting units 3a and a second row 4b comprising twelve lighting unit in an interdigitated configuration of key lighting units 3b' with fill lighting units 3b''.

FIG. 4 shows an example of a target area 11 which is patched with key light patches 51 and fill light patches 53. In this embodiment it is shown that the key light patches are smaller than the fill light patches, resulting in a higher resolution for key light than for fill light on target area portions as obtained by the lighting systems shown in FIG. 3A-D. To completely cover the target area with both key light and with fill light, the size of light patches generated by the key lighting units are relatively small, while the size of fill light patches as generated by the fill lighting units are relatively large, the ratio in patch size of fill light patches with respect to the size of key light patches is about 3. A slight overlap between adjacent light patches is allowable and shown. Furthermore, the light patches are each numbered, their numbering corresponds to the numbering of lighting units shown in FIG. 3A-D. In most cases, i.e. except for, for example, the arrangement shown in FIG. 3D, the sequence in lighting units is the same as the sequence in light patches.

Figure 5A:
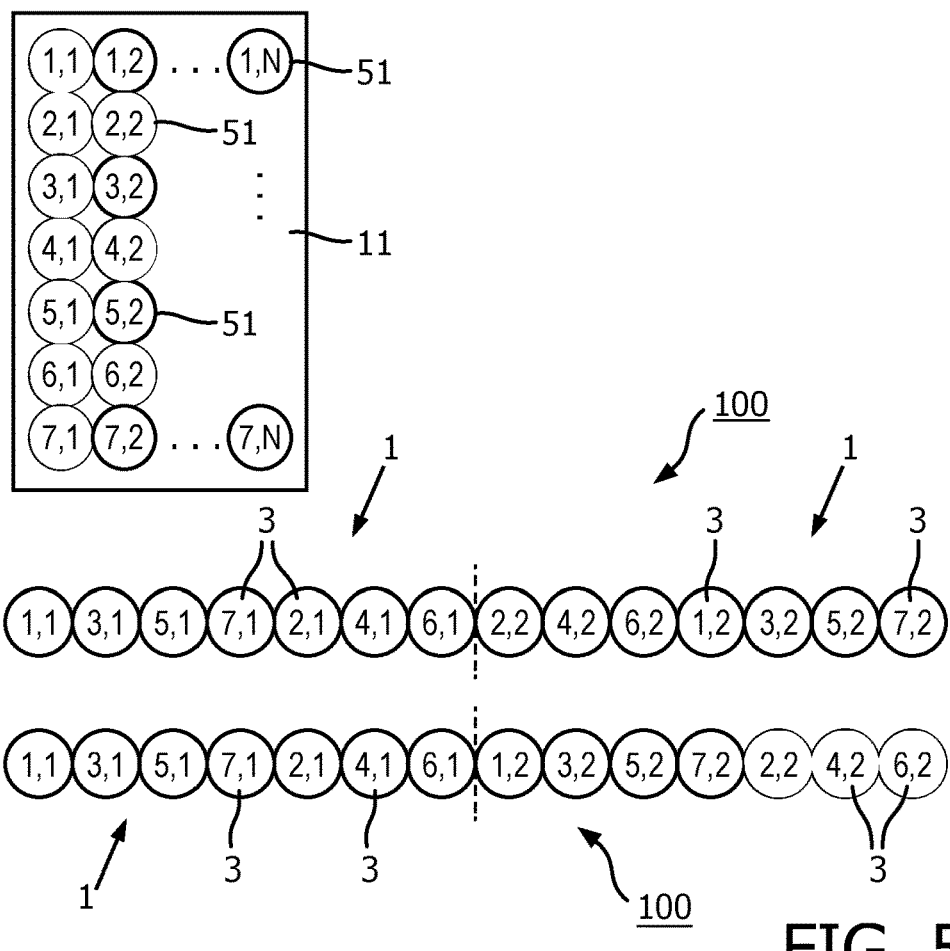
FIG. 5A-B shows some examples of interleaving.
Figure 5B:
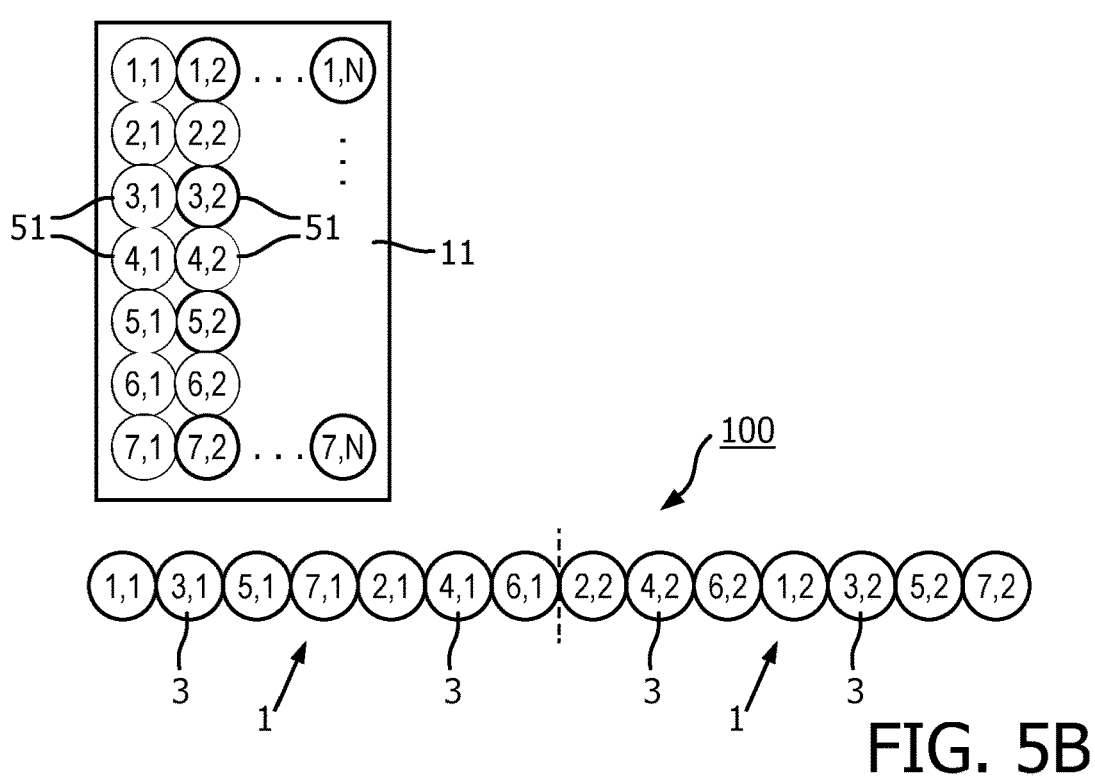

FIG. 5A-B shows two examples of interleaving. In FIG. 5A on the right, two examples of a lighting system 100 comprising two lighting devices 1 each with an arrangement of seven lighting units 3 per lighting device are shown, wherein the row position of the lighting unit does not necessarily correspond to the column position of the spot pixel/patch 51 on the target area 11 as shown on the left of FIG. 5A. The number in the lighting unit is associated with the same number in the target area, thus coupling a row position of a lighting unit to a column position of a patch in the target area. Said coupling of row position with the column position can be pre-arranged according to a desired algorithm, which is the case in FIGS. 5A-B, but which alternatively can be arbitrarily chosen. By choosing a specific arrangement, for example depending on desired lighting patterns, the positions of the lighting units in the lighting device can, for instance, be optimized for distributing thermal load. Particularly, a more even spreading of the thermal load may also be achieved with a layout like embodiment shown in FIG. 5B. In FIG. 5B it is shown that in the target area 11 four light patches 51 are projected next to each other which could lead in the lighting system 100, here comprising two lighting devices 1, to a local thermal load if the corresponding lighting units 3 generating said light patches are located next to each other. Yet, it is shown in FIG. 5B that said corresponding lighting units are more or less evenly spread over two lighting devices 1 thus spreading thermal load in the lighting system. If the fill lights patches are very broad and when projected on the target area are overlapping for a major part, the exact position of the fill light in the lighting system is less relevant, which could be used to further counteract high, local thermal load of the lighting system. The fill light sources close to hot spots (where neighboring key lights are all switched on) can then be dimmed down and other fill lights can be dimmed up to compensate for this.

FIG. 6 shows a lighting system 100 comprising two rows 4a,4b of lighting devices 1 extending parallel in the X (length) direction with an adjustable overlap of the two rows. The first row 4a comprises a lighting device la with lighting units 3a providing key light of a specific Tc or CCT, for example 3000K, and the second row 4b comprises a second lighting device 1b with second lighting units 3b providing fill light of a higher Tc or CCT, for example 5000K. The LEDs of the first lighting units emit light on a target area in a first direction 55 and the LEDs of the second lighting unit emit light in a second direction 57, said second direction being at an angle γ with the first direction with γ here being about 70°, thus the so-called McCandless effect can be obtained. By mutually shifting in the X-direction the second row with respect to the first row, the so-called McCandless effect can be tuned and/or optimized at desired locations on the target area by issuing light of mutually different CCT with different beam angles aimed from different positions on the same location of the target area. Typically this feature is used to particularly enhance the attractiveness of specific parts of displayed articles.

FIG. 7 shows a comparison between a conventional lighting system 101 for a shop window 1000 and a lighting system 100 according to the invention for illumination of a shop window 1000, both in front view and in side view of the shop window. As shown, the conventional lighting system comprises four relatively bulky, obtrusive and relatively high mounted conventional lighting units 102. On the contrary the lighting system of the invention has a relatively high number of lighting units comprised in several lighting devices 1, for example hundred lighting units or more, mounted in a relatively unobtrusive manner on a relatively low position. This renders the inventive lighting system to have the advantages over the known lighting system of, for example:

high resolution of light patches to illuminate the target area offering more possibilities to create desired, more sophisticated lighting pattern;

use of multiple lighting units illuminating the same patch on the target area, enabling, for example, to create the McCandless effect by using lighting units issuing light of mutually different CCT with different beam angles aimed from different positions on the same location of the target area;

superior possibilities in creation of dynamic lighting scenes;

installation of the desired lighting scene/pattern is easier, for example in that it is easier to reach or can be adjusted from a remote position (no need to use a ladder), and involves less risk on injuries to personal staff like shop window designers and less risk on damage and/or distortion of displayed articles.

Figure 8A:
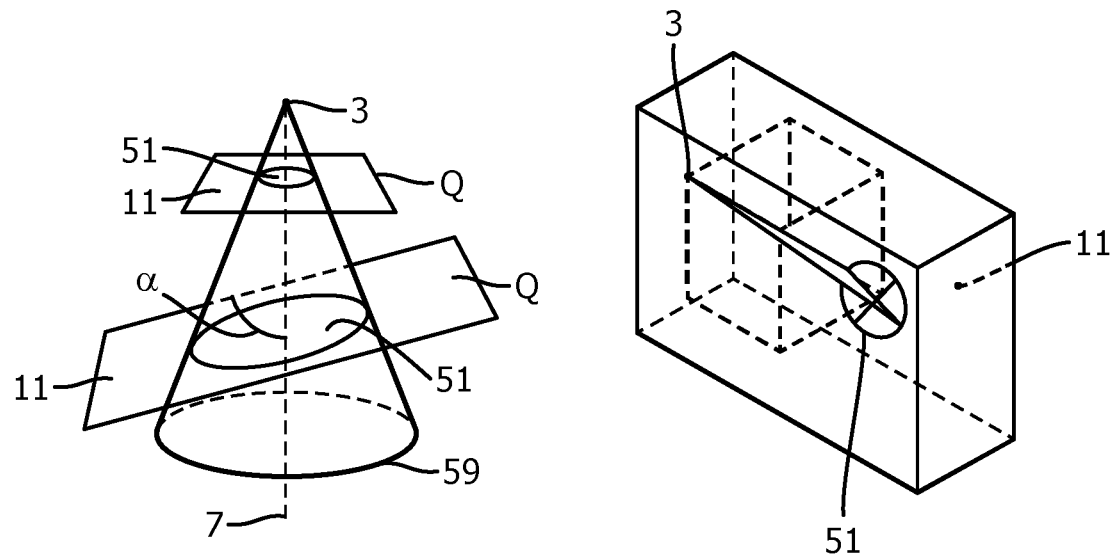
FIG. 8A-B explains mathematical relationships between position of lighting unit with respect to the target area, beam shape, and shape of projected patch on target area.
Figure 8B:
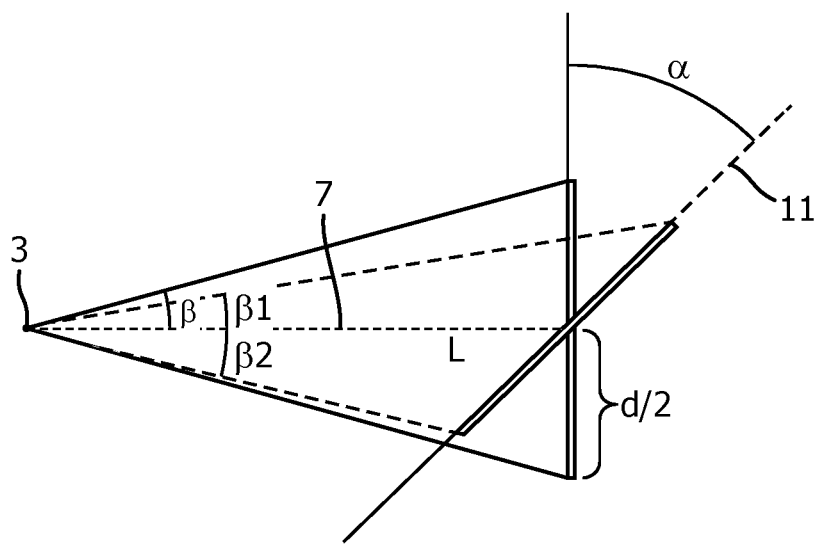

FIG. 8A-B explains mathematical relationships between position of lighting unit 3 with respect to the target area 11, beam shape 59, and shape of projected patch 51 on target area. The influence of distance and projection angle on spot shape is shown in FIG. 8A. To have each respective issued light beam by a respective lighting unit along a respective optical axis 7 to result in a same intensity I on the target area, I follows the relationship:

$$I \rightarrow (2*L*\tan \alpha)^2$$

wherein α is the angle between the respective optical axis 7 and (the plane Q of) the slanted target area 11, with α in the range of 5° to 85°, and wherein L is the distance between a respective lighting unit and the target area.

Yet, in essence, the spot becomes more or less elliptical, with a short axis that depends only on the distance between source and illuminated plane, and a long axis that also depends on the projection angle. In order to create more or less circular patches with a constant diameter, the beam width has to scale with projection distance, and the beam angles have to become asymmetric (approximately elliptical) to compensate for the projection angle. The relations between the beam angles β1,β2, projection distance L, and slant angle α are shown in FIG. 8B and are at least substantially follow the following relationships:

For generating a circular shaped patch on a slanted plane of the target area 11 a respective lighting unit 3 generates a respective light beam according to the following relationship:

$$\tan \beta 1 = D*\cos \alpha/(2*L+D*\sin \alpha)$$

$$\tan \beta 2 = D*\cos \alpha/(2*L-D*\sin \alpha),$$

wherein β1 and β2 relates to angles of beam width of half beam portions respectively on either side of the optical axis 7 of the lighting unit 3 for respectively the part of slanted surface of the target area more remote from the lighting unit than the part of said slanted surface being closer to the lighting unit, and wherein α is the angle between the respective optical axis and (the plane of) the slanted target area, with a in the range of 5° to 85°, and wherein L is the distance between a respective lighting unit and the target area.

Figure 9:
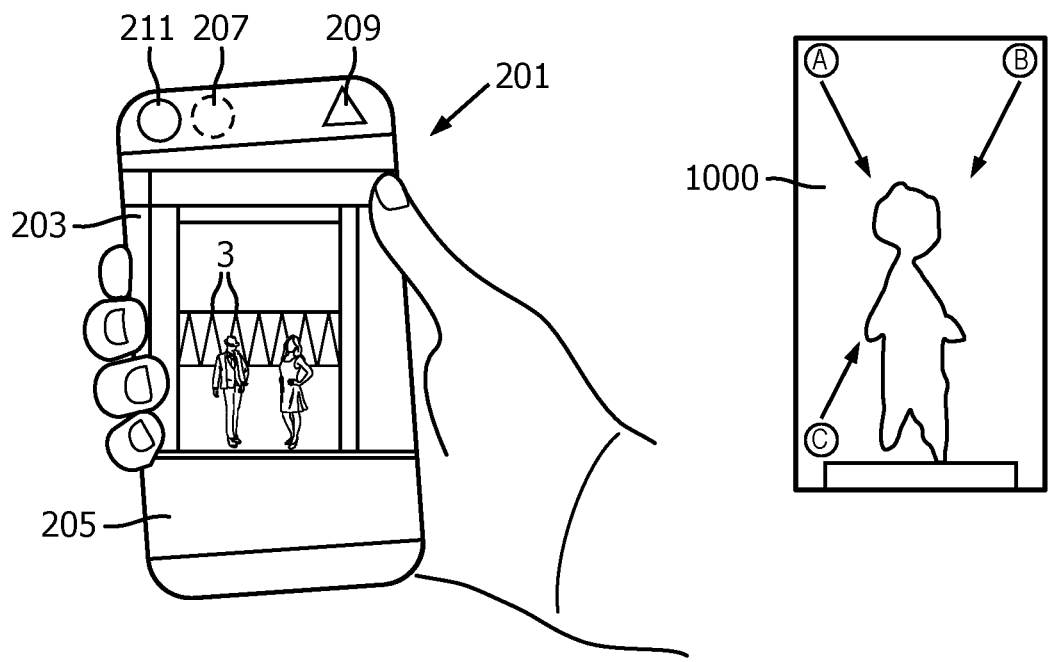
FIG. 9 shows a control unit for individual control/addressing of the lighting units of the at least first and further lighting device.

FIG. 9 shows a control unit 201 for individual control/addressing of the lighting units 3 of the at least first and further lighting device. The control unit comprises a graphical display 203, comprising a touch screen 205 as a convenient user interface, and is configured to monitor, picture and/or display in situ the patched pattern formed by the row of patches on a target area. For displaying in situ the patched pattern, the control unit comprises a (live-)camera 207. Further it is configured to be programmable with scenes for providing dynamic lighting scenes on a target area. Typically the set-up for a scene setting, such as for a shop window, can be done locally, i.e. at the location of the shop window itself, but alternatively or additionally said scene setting can be done remotely, for example by an expert from a central location where various shop windows for various branches of a shop chain are controlled by said expert. Thereto the control unit comprises a send/receive unit 209 for wireless electronic communication. When doing locally, and when standing outside the shop window one can take a picture of the current shop window scene and with help of a touch screen or, alternatively or additionally, a drawing device one can set the scene of the shop window 1000 to a desired setting by addressing which part of the scene should be highlighted and which parts can be left in the dark. The desired effect is realized by only activating the key and fill light spots (both indicated by character A) which are lighting a particular area in the vertical plane. So one first indicates the preferred area for the key and fill lighting effect. Only the spots aimed to this particular area are switched on. This could result in certain spots giving key light and others which deliver the fill light to reduce the over contrast full shadows. The spots aimed to an area which is not in use are not activated.

Next as an option one can indicate if and where a backlighting effect is asked for. With the same principle a matrix of spots installed in a backlight matrix (indicated by character B) can cover the complete vertical display plane but now from the back. For the position of the backlight matrix see cross section. In practice only a few of the spots will be activated for example to light the hair from behind, the other spots are off.

In line with the back light the same principle is applied to realize up or pin light. This is a spot normally installed at the bottom at the front of the shop window (indicated by character C). This are normally narrower beam spots used to high light special details or to make theatrical lighting effects from below. With the same principle a matrix of LED spots installed in the uplight matrix which can cover the complete vertical display plane but now from the front from below. For the position of the uplight matrix see cross section.

With the three separate matrices it is possible to realize a perfect lighting scene which holds key, fill, back and up or pin lighting. By adding a light sensor or a candela meter 211 to the control unit or lighting system in the shop window itself, it is possible to measure the lighting level or brightness in the shop window on the display on an area where there is no spotlight. This will enable to lower the intensity of the spots when the day lighting level goes down and to keep the contrast ratio the same. So, for example, in daytime it is possible to measure the ambient light level in the shop window which is caused by the daylight. For example when an accent factor of five is asked the lighting level on the display should be five times the lighting level made by the daylight. When the daylight level in the shop window goes below a certain value the contrast ratio can be kept by using lower spot intensities.

Ultimate in night time (for example for a level below 20 lux) it will be easy to make accent values of 1:40 or even more with dimmed spots this because the daylight level is close to zero. This dimming option in night time will have a positive influence on both the energy consumption and the preferred light balance in the shop window. Next the system allows to make dynamic scenes by switching or dimming between various spot groups. One has the possibility to change the accent factor or by using another spot group to change the angle of incidence. Also slow fade over scenes can be made this way. Mutual orientations of key light, fill light and back/pin light can be chosen to optimize the desired scene setting. For a more realistic/natural and attractive presentation it is preferred to use two different color temperatures and spots with different beam angles aimed from different positions. Like in a daylight outdoor situation the skylight which is diffused by clouds is normally without direction and cooler as the directional sunlight. To mimic this effect typically narrow beam spots with a lower color temperature from one side, i.e. key light, which mimic the directional warm, sun beams, are used. To fill in the (too hard) shadows wider beam spots are used having a higher color temperature from the other side, i.e. fill light, to mimic the cooler stray light or blue sky light. Typically it is preferred to have the key light and the fill light from opposite sides under a horizontal angle of 45 degrees and vertically under an angle of 30 degrees with the vertical As said, the method may be performed from a remote location. Typically the shot (photograph) is in digitalized form and the electronic means to transfer the shot are well-known, such as via internet, e-mail, wire-less data-communication systems. Instead of performing the method step by step from a remote location, the instructions for the new scene settings may also be collected and send as a set of instructions to the target shop window. This method also enables to monitor and/or maintain the status of a specific shop window, upon detection of failure of an active device of the lighting system, a signal to repair the system can be created, but alternatively or additionally, the settings of other devices of the lighting system can be adjusted from a central, remote location to compensate for the failure of said active device.

Figure 10:
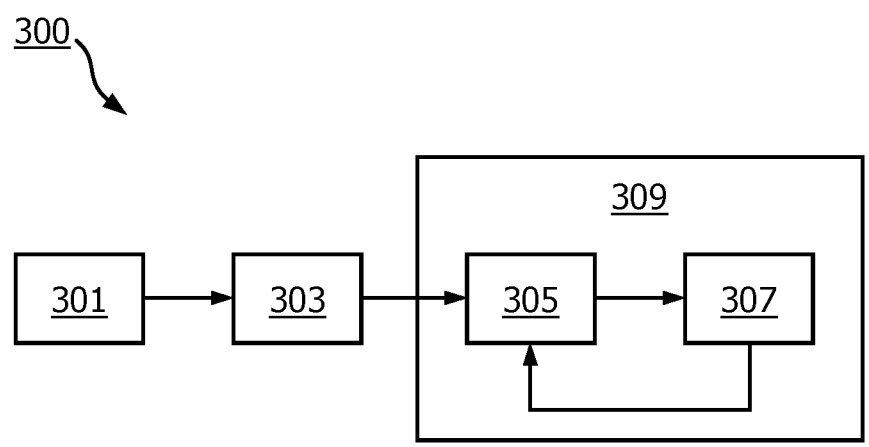
FIG. 10 shows the steps sequence to follow for setting a desired scene.

FIG. 10 shows the steps sequence to follow for setting a desired scene in, for example, a shop window. The method 300 comprises the steps of:
 taking a shot 301 of a shop window for which a scene is to be set;
 transferring the shot 303 via electronic means to a remote control station;
 performing the steps of selecting a scene for a target area;
 selectively switch on/off lighting units 305 to create a patched lighting pattern;
 assessing the obtained lighting effect 307 on the identified scene/target area, and
 optionally perform
 adjusting the obtained lighting effect 309 by a repetitive cycle of the step 305 and 307 until a satisfactory result of scene setting is obtained.
This step sequence can optionally be done via a remote control at the remote control station.

The invention claimed is:
1. A lighting system comprising at least one first lighting device comprising a plurality of first lighting units mounted only in a first direction along a length direction of an elongated carrier, each lighting unit being mounted with a respective, fixed, pre-determined orientation, said first lighting device being capably configured to directly project a closed patch pattern of a plurality of first light patches at a distance in a range of 1 m to 10 m between the lighting device and a target area, said closed pattern being a pattern without unlit spots when all first lighting units are in a switched-on mode,
 wherein said plurality of first light patches extends only in a second direction transverse to the first direction, and
 wherein said lighting system further comprises a control unit for individual control of the first lighting units of the at least first lighting device and of lighting units of at least one further lighting device comprised in the lighting system.

2. A lighting system as claimed in claim 1, wherein the at least one further lighting device comprises at least one second lighting device comprising a plurality of second lighting units mounted only in the first direction on the elongated carrier, each second lighting unit being mounted with a respective, fixed, pre-determined orientation, said second lighting device being configured to directly project a plurality of second light patches,
   wherein said plurality of second light patches extends only in the second direction,
   said at least first and at least second lighting device substantially lying in line in the length direction.

3. A lighting system as claimed in claim 2, wherein the first lighting device has first light sources of a first color, color temperature or CCT and the second lighting device has second light sources of a second, color, color temperature or CCT different from the first color, color temperature or CCT.

4. The lighting system as claimed in claim 1,
   wherein the first lighting devices are configured to issue a first beam type and further lighting devices are configured to issue a further beam type different from the first beam type,
   wherein the first beam type and further beam type are tunable with respect to at least one of color, color temperature, CCT and intensity, and
   wherein the control unit is configured to simultaneously, change via control signals the first beam type of the first lighting devices to the further beam type and the further beam type of the further lighting devices to the first beam type.

5. The lighting system as claimed in claim 1, wherein the control unit comprises a graphical display configured to display a patched pattern.

6. The lighting system as claimed in claim 5, wherein the graphical display comprises a touch screen by which the lighting units being controlled.

7. The lighting system as claimed in claim 1, wherein the control unit comprises a camera configured to monitor, picture and/or display in situ and/or in real time a patched pattern.

8. The lighting system as claimed in claim 7, wherein the camera comprises a sensor as an integrated or as a non-integrated device.

9. The lighting system as claimed in claim 1, wherein the control unit is configured to be programmable with scenes for providing dynamic lighting scenes on the target area.

10. The lighting system as claimed in claim 9, wherein the type of performed programmable scene is dependent on the time of day and/or ambient light level.

11. The lighting system as claimed in claim 1 configured as a shop window lighting.

12. A lighting method using a lighting system according to claim 1, said method comprising the steps of:
    selecting a desired scene for the target area;
    selectively switch on lighting units of a respective lighting device extending in the length direction to create a patched lighting pattern extending in a direction transverse direction to the length direction;
    assessing the obtained lighting effect on the scene by an expert; and
    repeat the steps of selectively switching on lighting units of lighting devices and assessing the obtained lighting effect until completion of the scene.

13. The lighting method as claimed in claim 12, further comprising the step of:
    adjusting the obtained lighting effect.

14. The method as claimed in claim 12 comprising the steps of:
    taking a photograph of a shop window for which a scene is to be set;
    transferring the photograph via electronic means to a remote control station.

\* \* \* \* \*